United States Patent
Muralidharan et al.

(10) Patent No.: US 8,166,309 B2
(45) Date of Patent: Apr. 24, 2012

(54) SYSTEM AND METHOD FOR A SECURE MULTI-LEVEL NETWORK ACCESS MECHANISM USING VIRTUAL SERVICE SET IDENTIFIER BROADCAST

(75) Inventors: Kartik Muralidharan, Bangalore (IN); Puneet Gupta, Bangalore (IN)

(73) Assignee: Infosys Technologies, Ltd., Bangalore (IN)

( * ) Notice: Subject to any disclaimer, the term of this patent is extended or adjusted under 35 U.S.C. 154(b) by 1234 days.

(21) Appl. No.: 11/797,208

(22) Filed: May 1, 2007

(65) Prior Publication Data
US 2009/0019283 A1  Jan. 15, 2009

(30) Foreign Application Priority Data
May 1, 2006 (IN) .............................. 841/CHE/2006

(51) Int. Cl.
*H04L 9/00* (2006.01)
(52) U.S. Cl. .................. 713/181; 726/2; 726/6

(58) Field of Classification Search .................. 713/168, 713/181; 370/338; 455/418; 726/2–3, 4, 726/6
See application file for complete search history.

(56) References Cited

U.S. PATENT DOCUMENTS

| | | | | |
|---|---|---|---|---|
| 7,505,443 | B2 * | 3/2009 | McNew et al. | 370/338 |
| 7,733,861 | B2 * | 6/2010 | Suga | 370/392 |
| 2006/0003756 | A1 * | 1/2006 | Kumaki | 455/418 |
| 2006/0041750 | A1 * | 2/2006 | Carter et al. | 713/168 |
| 2007/0086394 | A1 * | 4/2007 | Yamada et al. | 370/338 |
| 2007/0171910 | A1 * | 7/2007 | Kumar | 370/392 |

OTHER PUBLICATIONS

Cisco Systems, Wireless Virtual LAN Deployment Guide, pp. 1-35, 2003.*

* cited by examiner

*Primary Examiner* — Samson Lemma
(74) *Attorney, Agent, or Firm* — LeClairRyan, a Professional Corporation

(57) ABSTRACT

A method, system, and computer program product for network management, including masking a true service set identifier (SSID) in beacon frame; and broadcasting the beacon frame with the masked true SSID, whereby an authorized device retrieve the true SSID from the broadcast beacon frame.

30 Claims, 1 Drawing Sheet

SYSTEM AND METHOD FOR A SECURE MULTI-LEVEL NETWORK ACCESS MECHANISM USING VIRTUAL SERVICE SET IDENTIFIER BROADCAST

CROSS REFERENCE TO RELATED DOCUMENTS

This application claims priority under 35 U.S.C. §119 to Indian Patent Application Serial No. 841/CHE/2006 of MURALIDHARAN et al., entitled "A SECURE MULTI-LEVEL NETWORK ACCESS MECHANISM USING VIRTUAL SSID BROADCAST," filed May 1, 2006, the entire disclosure of which is hereby incorporated by reference herein.

BACKGROUND OF THE INVENTION

1. Field of the Invention

The present invention generally relates to the field of network access mechanisms, and more particularly, to a system and method for proactive network management that enables secure multi-level network access in a peer-to-peer and infrastructure setup using a service set identifier (SSID) field.

2. Discussion of the Background

A service set identifier (SSID) is a unique label that distinguishes one wireless local area network (WLAN) from another. Wireless devices use the SSID to establish and maintain connectivity. As part of the association process, a wireless network interface card (NIC) must have the same SSID as the access point or peer device. An SSID includes up to thirty two alphanumeric characters, which are case sensitive and because an SSID may be sniffed in plain text from a packet it does not supply any security to the network.

Traditional access points are only capable of supporting a singe SSID. In the case of peer-to-peer networks, typically, each device can maintain only a single ad hoc connection at a time. Many companies these days, however, are offering enterprise-class access points that support multiple SSIDs. This logically divides the access point into several virtual access points, all within a single hardware platform. Many companies want to take advantage of this technology, because using access points to support more than one application, such as public Internet access, inventory control, and the like, increases flexibility and keeps costs down.

The use of multiple SSIDs also means more flexibility when deploying a shared WLAN infrastructure. Instead of supporting only one type of application, possibly one that requires significant authentication and encryption, the WLAN can also maintain other applications that don't require such stringent controls. For example, the access point could support both public and operational users from a single access point.

The benefits of a shared infrastructure are certainly cost savings and enabling of mobile applications. For example, rather than having two separate WLANs (e.g., which probably isn't feasible), a company can deploy one WLAN and satisfy all requirements. The combination of multiple applications enables the ones having lower return on investment to be part of the WLAN. Sometimes a company needs to have several applications supported together to make the costs of deploying a WLAN feasible.

Because SSIDs are not encrypted or otherwise scrambled, it becomes easy to grab by snooping the WLAN looking for SSID broadcast messages coming from a device or access point. For example, knowing one's SSID brings hackers one step closer to a successful intrusion. While disabling SSID broadcast is just one of many techniques for tightening security on a wireless Ethernet (e.g., Wi-Fi) network, this technique is not 100% effective, as hackers can still detect the SSID by sniffing different messages in the Wi-Fi protocol. In the case of ad hoc connections, disabling SSID broadcast is not even an option.

Therefore, there is a need for a method and system for preventing rouge devices from accessing an ad hoc connection, preventing an accidental connection to rogue ad hoc connections, and providing additional network access levels for peer-to-peer networks.

SUMMARY OF THE INVENTION

The above and other needs are addressed by the present invention which provides, for example, a method, system, and software for proactive network management that enables secure multi-level network access in a peer-to-peer and infrastructure setup using a service set identifier (SSID) field.

Accordingly, in an exemplary aspects of the invention there is provided a method, system, and computer program product for network management, including masking a true service set identifier (SSID) in beacon frame; and broadcasting the beacon frame with the masked true SSID, whereby an authorized device retrieve the true SSID from the broadcast beacon frame.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

Figure 3:
FIG. 3 illustrates an exemplary network management mechanism using public key infrastructure (PKI), according to an exemplary embodiment of the present invention.

Referring now to the drawings, wherein like reference numerals designate identical or corresponding parts throughout the several views, and more particularly to FIGS. 1-4 thereof, which will be used to illustrate a method, system, and computer program product for network management, according to exemplary embodiments of the present invention.

In an exemplary embodiment, the concept of a virtual service set identifier (SSID) is introduced to address the above and other needs with conventional network management systems and methods. For example, the exemplary embodiments employ masking of a true SSID from that being broadcast in, for example, a beacon frame (e.g., which is part of a IEEE 802.11 wireless network protocol). Advantageously, only authorized nodes will be able to retrieve the true SSID from the frame. In further exemplary embodiments, overlay can be further employed, wherein a device originating a connection is able to identify a connecting host through an association response frame, thereby facilitating multiple access levels.

Advantageously, the novel exemplary concept of multiple virtual SSIDs allows users to access different networks through a single device. In addition, network managers can assign different policies and functions for each SSID, increasing the flexibility and efficiency of the network infrastructure, and preventing unauthorized or accidental access to rouge devices and networks.

The exemplary embodiments provide various options for achieving multiple virtual SSIDs in a secure manner. For example, while exemplary mechanisms can be used to secure a connection by means of hiding the true SSID and thereby preventing misuse, the communication channel itself need not be secured. However, in further exemplary embodiments, channel security can be accomplished using any suitable mechanisms, such as Wired Equivalent Privacy (WEP)/Wi-Fi protected access-pre-shared key (WPA-PSK), and the like. For example, in an exemplary embodiment, information (e.g., WEP/WPA key) can be embedded within the SSID.

Figure 1:
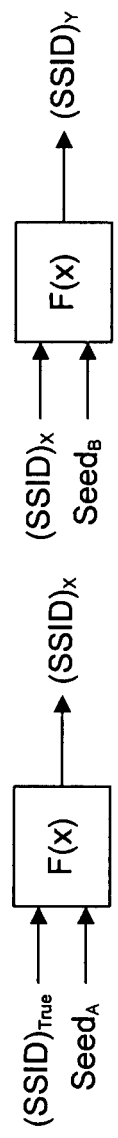
FIG. 1 illustrates an exemplary network management mechanism using a shared key, according to an exemplary embodiment of the present invention.

In an exemplary embodiment, using of a shared key can be employed, for example, as shown in FIG. 1. In this exemplary embodiment, a key is shared among a group of users, which is then used to encrypt and decrypt the true SSID. In another exemplary embodiment, the true SSID can be a hash of the broadcasted SSID.

Figure 2:
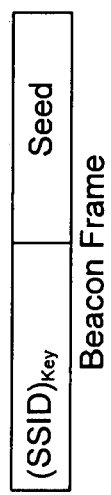
FIG. 2 illustrates an exemplary network management mechanism using a signature and service set identifier (SSID) pair, according to an exemplary embodiment of the present invention.

In an exemplary embodiment, using of a signature and SSID pair can be employed, for example, as shown in FIG. 2. In this exemplary embodiment, the SSID field is divided into two portions. The first caries the actual SSID encrypted with a 'key' and the second the 'seed' used to generate the 'key'.

At the client end the 'seed' is used to derive the key, which in turn is used to obtain the actual SSID. In an exemplary embodiment, the Association Request frame (e.g., which is part of a IEEE 802.11 wireless network protocol) includes the actual SSID in turn encrypted with a random client seed.

The advantages of the above exemplary embodiments, for example, include (a) the seed needing not to be stored locally, (b) not being subject to a replay attack, as the beacon frame is different from the Association Request frame, and (c) the SSID in the association response not being in plain text.

The above exemplary embodiments address securing of ad-hoc connections by preventing rogue access, advantageously, being useful in an enterprise context, where devices are pre-installed with appropriate software. For example, a rogue/unauthorized device attempting to connect/host an ad hoc connection would fail, as the exemplary mechanisms take precedence during connection establishment.

In an exemplary embodiment, using of public key infrastructure (PKI) can be employed, for example, as shown in FIG. 3. In this exemplary embodiment, the device hosting the ad hoc service encrypts the SSID using its private key. At the client end, the public key corresponding to the media access control (MAC) address retrieved from the frame is used to decrypt the SSID field and obtain the actual value. The Association Request frame includes the actual SSID value in turn encrypted with the client's private key. The identity of the client (e.g., using the public key) may be used to provide the corresponding network access level.

The advantages of the above exemplary embodiments include (a) using standard PKI architecture, (b) no secret function being required, and (c) not being subject to replay attack, as the beacon frame is different from the Association Request frame.

Figure 4:
FIG. 4 illustrates an exemplary network management mechanism using an individual seed value, according to an exemplary embodiment of the present invention.

In an exemplary embodiment, using of an individual seed value can be employed, for example, as shown in FIG. 4. In this exemplary embodiment, the SSID in the broadcast message is not the true SSID, but rather the result of feeding the true SSID to an appropriate 'hash' function (F(x)). The resulting value is then inserted into the SSID field of the beacon frame. The correct SSID is extracted at the other end by a similar reverse hash mechanism. In addition, the SSID value returned from the 'reverse' hash function would be different (e.g., within a finite range) based on a seed value inserted into the function. The level of network access is defined, for example, based on the corresponding SSID in the association response frame. Advantageously, this allows a finite set of access levels to be defined at the peer/access point.

For example, lets say the true SSID is 'wireless'. The corresponding hash and broadcast value then might be a scrambled/plain text SSID, such as 'protected'. This value when fed to the reverse hash function along with the corresponding seed would result in different SSID values, such as 'Guest', 'Internet', and 'Admin,' and so on. Based on this value, the level of network access is determined. The seed values corresponding to the respective SSID would also be within a finite set, for example, defined for a particular group. For example, the seed values corresponding to the SSID 'guest' might be (e.g., 11, 21, 31, 41, 51), the seed value corresponding to SSID 'Admin' might be (e.g., 22, 33, 44), and so on.

Advantageously, the above exemplary embodiments would prove useful in an enterprise scenario where groups of people need to be assigned specific levels of access. Each group will have a specific shared key or a set of keys as the seed value, which in turn would correspond with a particular SSID.

Often, when setting up a secure peer-to-peer network, the WEP/WPA-PSK key needs to be shared beforehand among the group. In the case the key is changed, according to further exemplary embodiments, notification mechanisms can be employed.

In a further exemplary embodiment, embedding of the security key with the transmitted SSID is employed. The security key can then be extracted at the end node and used for the session. As will be appreciated by those skilled in the relevant art(s), such exemplary embodiments can be employed in conjunction with the previously described or further described exemplary embodiments.

In further exemplary embodiments, embedding of WEP/WPA-PSK key within a SSID can be employed. In an exemplary embodiment, using of a pre-shared key can be employed, for example, wherein a shared key is distributed among a group of users. This key is then used to mask the SSID+WEP/PSK pair. The receiving node uses the same key to extract the pair. In this exemplary embodiment, although a shared key is employed, the securing of the transmission is seamless.

In an exemplary embodiment, using of a WEP/PSK key generated using the SSID can be employed. For example, the SSID in the beacon frame is used to generate the secret key for the session. This may be done using a function along with a seed value. This seed could be any suitable, thing, for example, ranging from the time or a temporal value to a shared key.

An exemplary scenario would be as follows. The peer device originating the ad-hoc connection can use a pre-shared key or a seed value along with the chosen WEP/WPA PSK key to generate the SSID. For example, the pre-shared key could be 'Infosys' combined with the chosen WEP key 'secure' to generate the SSID 'ad hoc'. The generated SSID then is used to setup the connection. On the client end, the received SSID is used to regenerate the WEP key to be used to secure the connection.

In an exemplary embodiment, using of stenography (e.g., the art and science of writing hidden messages in such a way that no one apart from the intended recipient knows of the existence of the message) can be employed. For example, this can be accomplished in a manner similar to previous exemplary embodiment, but employing any suitable stenographic algorithm.

Figure 5:
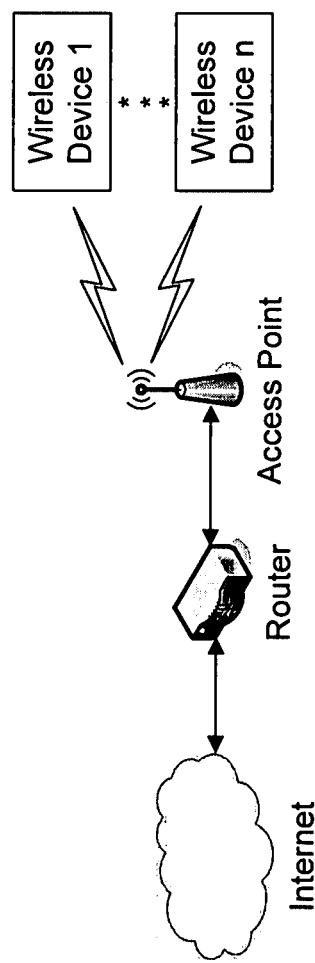
FIG. 5 illustrates an exemplary network that can be employed to practice the exemplary embodiments of FIG. 1-4, according to an exemplary embodiment of the present invention

FIG. 5 illustrates an exemplary network that can be employed to practice the exemplary embodiments of FIG. 1-4. In FIG. 5, the exemplary network can include one or more routers for coupling to other communications networks, such as the Internet, a LAN, a WLAN, and the like, one or more wireless access points coupled to the routers, and one or more wireless devices coupled to the access points.

The above-described devices and subsystems of the exemplary embodiments of FIGS. 1-4 can include, for example, any suitable servers, workstations, PCs, laptop computers, PDAs, Internet appliances, handheld devices, cellular telephones, wireless devices, other devices, and the like, capable of performing the processes of the exemplary embodiments of FIGS. 1-4. The devices and subsystems of the exemplary embodiments of FIGS. 1-4 can communicate with each other using any suitable protocol and can be implemented using one or more programmed computer systems or devices.

One or more interface mechanisms can be used with the exemplary embodiments of FIGS. 1-4, including, for example, Internet access, telecommunications in any suitable form (e.g., voice, modem, and the like), wireless communications media, and the like. For example, the employed communications networks can include one or more wireless communications networks, cellular communications networks, 3 G communications networks, Public Switched Telephone Network (PSTNs), Packet Data Networks (PDNs), the Internet, intranets, a combination thereof, and the like.

It is to be understood that the devices and subsystems of the exemplary embodiments of FIGS. 1-4 are for exemplary purposes, as many variations of the specific hardware and/or software used to implement the exemplary embodiments are possible, as will be appreciated by those skilled in the relevant art(s). For example, the functionality of one or more of the devices and subsystems of the exemplary embodiments of FIGS. 1-4 can be implemented via one or more programmed computer systems or devices.

To implement such variations as well as other variations, a single computer system can be programmed to perform the special purpose functions of one or more of the devices and subsystems of the exemplary embodiments of FIGS. 1-4. On the other hand, two or more programmed computer systems or devices can be substituted for any one of the devices and subsystems of the exemplary embodiments of FIGS. 1-4.

Accordingly, principles and advantages of distributed processing, such as redundancy, replication, and the like, also can be implemented, as desired, to increase the robustness and performance the devices and subsystems of the exemplary embodiments of FIGS. 1-4.

The devices and subsystems of the exemplary embodiments of FIGS. 1-4 can store information relating to various processes described herein. This information can be stored in one or more memories, such as a hard disk, optical disk, magneto-optical disk, RAM, and the like, of the devices and subsystems of the exemplary embodiments of FIGS. 1-4. One or more databases of the devices and subsystems of the exemplary embodiments of FIGS. 1-4 can store the information used to implement the exemplary embodiments of the present invention. The databases can be organized using data structures (e.g., records, tables, arrays, fields, graphs, trees, lists, and the like) included in one or more memories or storage devices listed herein. The processes described with respect to the exemplary embodiments of FIGS. 1-4 can include appropriate data structures for storing data collected and/or generated by the processes of the devices and subsystems of the exemplary embodiments of FIGS. 1-4 in one or more databases thereof.

All or a portion of the devices and subsystems of the exemplary embodiments of FIGS. 1-4 can be conveniently implemented using one or more general purpose computer systems, microprocessors, digital signal processors, microcontrollers, and the like, programmed according to the teachings of the exemplary embodiments of the present invention, as will be appreciated by those skilled in the computer and software arts. Appropriate software can be readily prepared by programmers of ordinary skill based on the teachings of the exemplary embodiments, as will be appreciated by those skilled in the software art. In addition, the devices and subsystems of the exemplary embodiments of FIGS. 1-4 can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware circuitry and/or software.

Stored on any one or on a combination of computer readable media, the exemplary embodiments of the present invention can include software for controlling the devices and subsystems of the exemplary embodiments of FIGS. 1-4, for driving the devices and subsystems of the exemplary embodiments of FIGS. 1-4, for enabling the devices and subsystems of the exemplary embodiments of FIGS. 1-4 to interact with a human user, and the like. Such software can include, but is not limited to, device drivers, firmware, operating systems, development tools, applications software, and the like. Such computer readable media further can include the computer program product of an embodiment of the present invention for performing all or a portion (if processing is distributed) of the processing performed in implementing the exemplary embodiments of FIGS. 1-4. Computer code devices of the exemplary embodiments of the present invention can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the exemplary embodiments of the present invention can be distributed for better performance, reliability, cost, and the like.

As stated above, the devices and subsystems of the exemplary embodiments of FIGS. 1-4 can include computer readable medium or memories for holding instructions programmed according to the teachings of the present invention and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave, or any other suitable medium from which a computer can read.

While the present invention have been described in connection with a number of exemplary embodiments and implementations, the present invention is not so limited, but rather covers various modifications and equivalent arrangements, which fall within the purview of the appended claims.

What we claim is:

1. A method for network management, the method comprising:
   hashing, by a network management computing device, a true service set identifier (SSID) with a hash function to determine a broadcast SSID;
   broadcasting, by the network management computing device, a beacon frame comprising the broadcast SSID;
   receiving, by the network management computing device from an authorized computing device, an extracted SSID that is different from the true SSID, wherein the extracted SSID is determined by inputting the broadcast SSID and one of a plurality of valid seed values into a reverse hash function; and
   determining, by the network management computing device, a network access level for the authorized computing device based on the received extracted SSID.

2. The method of claim 1, wherein a first portion of the plurality of valid seed values corresponds to a first extracted SSID and wherein a second portion of the plurality of valid seed values corresponds to a second extracted SSID.

3. The method of claim 2, wherein the first extracted SSID corresponds to a first network access level and the second extracted SSID corresponds to a second network access level.

4. The method of claim 1, wherein the extracted SSID is received, by the network management computing device from the authorized computing device, in an association response frame.

5. The method of claim 1, wherein hashing further comprises inputting, by the network management computing device, another of the plurality of valid seed values into the hash function to determine the broadcast SSID.

6. The method of claim 1, further comprising embedding, by the network management computing device, a security key with the broadcast SSID, wherein the security key is extracted for a session.

7. The method of claim 1, further comprising embedding, by the network management computing device, a wired equivalent privacy/Wi-Fi protected access-pre-shared key (WEP/WPA-PSK) with the broadcast SSID to provide communications channel security.

8. The method of claim 7, further comprising:
   distributing, by the network management computing device, a shared key amongst a group of authorized devices; and
   encrypting, by the network management computing device, the broadcast SSID and WEP/WPA-PSK pair with the shared key.

9. The method of claim 7, further comprising generating, by the network management computing device, the WEP/WPA-PSK using the broadcast SSID.

10. The method of claim 7, further comprising generating, by the network management computing device, the WEP/WPA-PSK using stenography.

11. A network management computing device for managing a network, the device comprising:
    one or more processors;
    a memory coupled to the one or more processors which are configured to execute programmed instructions stored in the memory, the programmed instructions comprising:
    hashing a true service set identifier (SSID) with a hash function to determine a broadcast SSID;
    broadcasting a beacon frame comprising the broadcast SSID;
    receiving, from an authorized computing device, an extracted SSID that is different from the true SSID, wherein the extracted SSID is determined by inputting the broadcast SSID and one of a plurality of valid seed values into a reverse hash function; and
    determining a network access level for the authorized computing device based on the received extracted SSID.

12. The device as set forth in claim 11, wherein a first portion of the plurality of valid seed values corresponds to a first extracted SSID and wherein a second portion of the plurality of valid seed values corresponds to a second extracted SSID.

13. The device as set forth in claim 12, wherein the first extracted SSID corresponds to a first network access level and the second extracted SSID corresponds to a second network access level.

14. The device as set forth in claim 11, wherein the extracted SSID is received from the authorized computing device in an association response frame.

15. The device as set forth claim 11, wherein hashing further comprises inputting another of the plurality of valid seed values into the hash function to determine the broadcast SSID.

16. The device as set forth in claim 11, further comprising embedding a security key with the broadcast SSID, wherein the security key is extracted for a session.

17. The device as set forth in claim 11, further comprising embedding a wired equivalent privacy/Wi-Fi protected access-pre-shared key (WEP/WPA-PSK) with the broadcast SSID to provide communications channel security.

18. The device as set forth in claim 17, further comprising:
    distributing a shared key amongst a group of authorized devices; and
    encrypting the broadcast SSID and WEP/WPA-PSK pair with the shared key.

19. The device as set forth in claim 17, further comprising generating the WEP/WPA-PSK using the broadcast SSID.

20. The device as set forth in claim 17, further comprising generating the WEP/WPA-PSK using stenography.

21. A non-transitory computer-readable storage medium having stored thereon instructions for network management, the instructions comprising machine executable code which, when executed by at least one processor, causes the processor to perform steps comprising:

hashing a true service set identifier (SSID) with a hash function to determine a broadcast SSID;

broadcasting a beacon frame comprising the broadcast SSID;

receiving, from an authorized computing device, an extracted SSID that is different from the true SSID, wherein the extracted SSID is determined by inputting the broadcast SSID and one of a plurality of valid seed values into a reverse hash function; and determining a network access level for the authorized computing device based on the received extracted SSID.

22. The medium as set forth in claim 21, wherein a first portion of the plurality of valid seed values corresponds to a first extracted SSID and wherein a second portion of the plurality of valid seed values corresponds to a second extracted SSID.

23. The medium as set forth in claim 22, wherein the first extracted SSID corresponds to a first network access level and the second extracted SSID corresponds to a second network access level.

24. The medium as set forth in claim 21, wherein the extracted SSID is received from the authorized computing device in an association response frame.

25. The medium as set forth in claim 21, wherein hashing further comprises inputting another of the plurality of valid seed values into the hash function to determine the broadcast SSID.

26. The medium as set forth in claim 21, further comprising embedding a security key with the broadcast SSID, wherein the security key is extracted for a session.

27. The medium as set forth in claim 21, further comprising embedding a wired equivalent privacy/Wi-Fi protected access-pre-shared key (WEP/WPA-PSK) with the broadcast SSID to provide communications channel security.

28. The medium as set forth in claim 27, further comprising:

distributing a shared key amongst a group of authorized devices; and encrypting the broadcast SSID and WEP/WPA-PSK pair with the shared key.

29. The medium as set forth in claim 27, further comprising generating the WEP/WPA-PSK using the broadcast SSID.

30. The medium as set forth in claim 27, further comprising generating the WEP/WPA-PSK using stenography.

\* \* \* \* \*